US009430235B2

United States Patent
Alexander et al.

(10) Patent No.: US 9,430,235 B2
(45) Date of Patent: *Aug. 30, 2016

(54) PREDICTING AND AVOIDING OPERAND-STORE-COMPARE HAZARDS IN OUT-OF-ORDER MICROPROCESSORS

(71) Applicant: International Business Machines Corporation, Armonk, NY (US)

(72) Inventors: Gregory W. Alexander, Pflugerville, TX (US); Khary J. Alexander, Poughkeepsie, NY (US); Brian Curran, Saugerties, NY (US); Jonathan T. Hsieh, Manchester, CT (US); Christian Jacobi, Poughkeepsie, NY (US); James R. Mitchell, Poughkeepsie, NY (US); Brian R. Prasky, Wappingers Falls, NY (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 13/953,303

(22) Filed: Jul. 29, 2013

(65) Prior Publication Data

US 2013/0318330 A1   Nov. 28, 2013

Related U.S. Application Data (63) Continuation of application No. 12/822,960, filed on Jun. 24, 2010, now Pat. No. 8,521,992, which is a continuation-in-part of application No. 12/644,923, filed on Dec. 22, 2009, now Pat. No. 8,468,325.

(51) Int. Cl.
*G06F 9/30* (2006.01)
*G06F 9/38* (2006.01)

(52) U.S. Cl.
CPC .......... *G06F 9/30043* (2013.01); *G06F 9/383* (2013.01); *G06F 9/3826* (2013.01); *G06F 9/3834* (2013.01); *G06F 9/3836* (2013.01); *G06F 9/3838* (2013.01)

(58) Field of Classification Search
None
See application file for complete search history.

(56) References Cited

U.S. PATENT DOCUMENTS

| 5,619,662 A | 4/1997 | Steely, Jr. et al. |
| 5,640,588 A | 6/1997 | Vegesna et al. ................ 712/23 |

(Continued)

FOREIGN PATENT DOCUMENTS

| JP | 2005532613 | 10/2005 |
| JP | 2007536626 | 12/2007 |
| WO | 0135212 A1 | 5/2001 |
| WO | 2005111794 A1 | 11/2005 |

OTHER PUBLICATIONS

Smruti R. Sarangi and Abhishek Tiwari and Josep Torrelas, Phoenix: Detecting and Recovering from Permanent Processor Design Bugs with Programmable Hardware, Proc. Ann. IEEE/ACM International Symposium, 2006, Microarchitecture (Micro 06), IEEE CS Press.

(Continued)

*Primary Examiner* — Corey S Faherty
(74) *Attorney, Agent, or Firm* — Fleit Gibbons Gutman Bongini Bianco PL; Jose Gutman (57) ABSTRACT

A method and information processing system manage load and store operations that can be executed out-of-order. At least one of a load instruction and a store instruction is executed. A determination is made that an operand store compare hazard has been encountered. An entry within an operand store compare hazard prediction table is created based on the determination. The entry includes at least an instruction address of the instruction that has been executed and a hazard indicating flag associated with the instruction. The hazard indicating flag indicates that the instruction has encountered the operand store compare hazard. When a load instruction is associated with the hazard indicating flag, the load instruction becomes dependent upon all store instructions associated with a substantially similar hazard indicating flag.

20 Claims, 8 Drawing Sheets

(56) References Cited

U.S. PATENT DOCUMENTS

| | | |
|---|---|---|
| 5,666,506 A | 9/1997 | Hesson et al. |
| 5,781,752 A | 7/1998 | Moshovos et al. |
| 5,913,048 A | 6/1999 | Cheong et al. |
| 5,999,727 A | 12/1999 | Panwar et al. ............... 712/225 |
| 6,219,742 B1 | 4/2001 | Stanley |
| 6,463,523 B1 | 10/2002 | Kessler et al. |
| 6,999,952 B1 | 2/2006 | Pham |
| 2003/0126409 A1 | 7/2003 | Juan et al. ............... 712/218 |
| 2005/0223292 A1 | 10/2005 | Lee et al. |
| 2006/0053343 A1 | 3/2006 | Hayem |
| 2009/0210659 A1 | 8/2009 | Carlough et al. |
| 2009/0210679 A1 | 8/2009 | Tsai et al. |

OTHER PUBLICATIONS

International Search Report and Written Opinion for PCT/EP2010/069496 dated Jan. 26, 2011.

Moshavos, A., et al., "Streamlining Inter-Operation Memory Communication Via Data Dependence Prediction," Proceedings of the 30th Annual IEEE/ACM International Symposium on Microarchitecture, Micro-30, Research Triangle Park, NC, Dec. 1-3, 1997; [Proceedings of the Annual International Symposium on Microarchitecture], Los Alamitos, CA: IEEE Computer, vol. 30th Conf., Dec. 1, 1997, pp. 235-245, XP010261300.

Alexander, G., et al., U.S. Appl. No. 12/822,960, filed Jun. 24, 2010, Predicting and Avoiding Operand-Store-Compare Hazards in Out-of-Order Processors.

Non Final Office Action dated Oct. 25, 2012 received for U.S. Appl. No. 12/644,923.

Moshovos, A., et al., "Speculative Memory Cloaking and Bypassing", International Journal of Parallel Programming—Special issue on the 30th annual ACM/IEEE international symposium on microarchitecture, Dec. 1999, pp. 1-16, vol. 27, Issue 6.

Moshovos, A. et al., "Streamlining Inter-operation Memory Communication via Data Dependence Prediction", Microarchitecture, 1997. Proceedings, Thirtieth Annual IEEE/ACM International Symposium on, USA, IEEE, Dec. 3, 1997, pp. 1-12.

PREDICTING AND AVOIDING OPERAND-STORE-COMPARE HAZARDS IN OUT-OF-ORDER MICROPROCESSORS

CROSS-REFERENCE TO RELATED APPLICATIONS

This application is a continuation of co-pending U.S. patent application Ser. No. 12/822,960, filed on Jun. 24, 2010, which is a continuation-in-part of U.S. patent application Ser. No. 12/644,923, filed on Dec. 22, 2009, the entire collective disclosure of which being hereby incorporated by reference.

FIELD OF THE INVENTION

The present invention generally relates to microprocessors, and more particularly relates to managing load and store operations executed out-of-order.

BACKGROUND OF THE INVENTION

A microprocessor that is capable of issuing and executing machine instructions out of order will in general permit loads to be executed ahead of stores. This feature permits a large performance advantage provided that the load address and the store address do not both have the same physical address. In typical programs, the frequency that a load proceeds ahead of the store and that their physical address matches is low. However, since the discovery of this store violation condition is typically late in the instruction execution pipeline, the recovery penalty can be quite severe. For example, the recovery process typically involves invalidating the load instruction that caused the violation and all newer instructions in program order beyond the load instruction, and second reissuing the load instruction. Conventional mechanisms for managing store-compare hazards generally do not manage these hazards very effectively.

SUMMARY OF THE INVENTION

In one embodiment, an information processing system for managing load and store operations executed out-of-order is disclosed. The information processing system comprises a memory and a processor that is communicatively coupled to the memory. The processor is configured to perform a method comprising executing at least one of a load instruction and a store instruction. A determination is made, based on the executing, that an operand store compare hazard has been encountered. An entry within an operand store compare hazard prediction table is created based on the determination. The entry comprises at least an instruction address of the instruction that has been executed and a hazard indicating flag (such as a bit) associated with the instruction. The hazard indicating flag indicates that the instruction has encountered the operand store compare hazard.

In another embodiment, a method for managing load and store operations executed out-of-order is disclosed. The method comprises fetching an instruction. The instruction is one of a load instruction and a store instruction. The instruction is decoded. An operand store compare hazard prediction table is queried with an instruction address of the instruction in response to the decoding. The operand store compare hazard prediction table comprises a first entry for a load instruction and a second entry for a store instruction. The first and second entries are independent of each other. The first and second entries indicate that the load instruction and the store instruction, respectively, have previously encountered an operand store compare hazard. The first and second entries comprise at least an instruction address of one of the load instruction and store instruction, respectively, and a hazard indicating flag associated with an operand store compare hazard. A determination is made, in response to querying the prediction table, that the instruction is associated with one of the first and second entries in the operand store compare hazard prediction table. The hazard indicating flag included within the one of the first and second entries associated with the instruction is identified based on the determination. When the instruction is associated with the first entry, the instruction is a load instruction. The instruction is marked based on the hazard indicating flag that has been identified. The marking makes an execution of the instruction dependent upon at least one store instruction, associated with an entry of the prediction table comprising a hazard indicating flag substantially similar to the hazard indicating flag associated with the instruction, having reached a given execution stage. When the instruction is associated with the second entry, the instruction is a store instruction.

In yet another embodiment, an information processing system for managing load and store operations executed out-of-order is disclosed. The information processing system comprises a memory and a processor that is communicatively coupled to the memory. The processor is configured to perform a method comprising executing at least one of a load instruction and a store instruction. A determination is made, based on the executing, that an operand store compare hazard has been encountered. An entry within an operand store compare hazard prediction table is created based on the determination. The entry comprises at least an instruction address of the instruction that has been executed and a hazard indicating flag (such as a bit) associated with the instruction. The hazard indicating flag indicates that the instruction has encountered the operand store compare hazard.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Overview

In microprocessors that execute load and store instructions out-of-order, three operand-store-compare hazards (store-hit-load, non-forwardable load-hit store, and persistent non-forwardable load-hit store) can occur due to reordering between dependent loads and stores. For example, assume that a Store to address A is followed by a Load to address A. In one situation the Load can execute before the Store, i.e., the Store Queue (STQ) does not comprise the store address information. Therefore, the store queue does not indicate a conflict when the load executes. Once the Load finishes execution, the Store executes and detects the conflict against the already finished Load in the load queue and flushes the pipeline to stop the Load and any subsequent instruction. This is a very costly operation since a large amount of work needs to be redone (the Load and all future instructions that were already executed speculatively before). The situation above is referred to as a Store-hit-Load (SHL).

In another situation the Store executes its address calculation, but the data for the Store is delayed, e.g. because the data-producing instruction has a long latency (e.g. divide). Then the Load executes before the store data is written into the STQ. The Load detects that it is dependent on the Store, but the Load cannot perform store-data-forwarding since the data is not available. Therefore, the Load needs to reject and retry later on after the store data has become available. This situation is referred to as a non-forwardable Load-hit-Store (nf-LHS).

In yet another situation, similar to the nf-LHS situation discussed above, certain store instructions (e.g. if they are line-crossing, or if the length>8 bytes) may not be forwardable in general (per the specific STQ design). In this situation, the Load, even if the store data is already written into the STQ, needs to recycle over and over again until the Store is written back into the L1 cache. This situation is referred to as a "persistent nf-LHS".

Conventional mechanisms for managing out-of-order processing, in general, do not effectively handle the three hazards discussed above. For example, some conventional mechanisms restrict Instruction-Level-Parallelism (ILP) by making the Load dependent on all prior Store instructions. Other conventional mechanisms generally cannot handle the common case where a Load instruction is dependent on multiple store instructions, where those multiple store instructions may be on different branch paths leading to the Load instruction.

However, one advantage of the various embodiments of the present invention is that the three hazards discussed above are effectively avoided. A prediction table, in at least one embodiment, is created that predicts which Loads and Stores have dependencies, and the type of these dependencies (such as e-bit or w-bit dependencies). Then after instruction decoding, e-bit Loads are made dependent on all prior e-bit Stores, and are treated by the instruction issue logic as if there was a regular register dependency. This effectively delays execution of the e-bit Load instruction until after all e-bit Stores have executed their address calculation, and written their data into the STQ. This in effect removes SHL and nf-LHS hazards. For w-bit dependencies, the Load is made dependent on the L1 cache writeback of the last store that was predicted as w-bit Store. This effectively prevents persistent nf-LHS hazards.

Operating Environment

Figure 1:
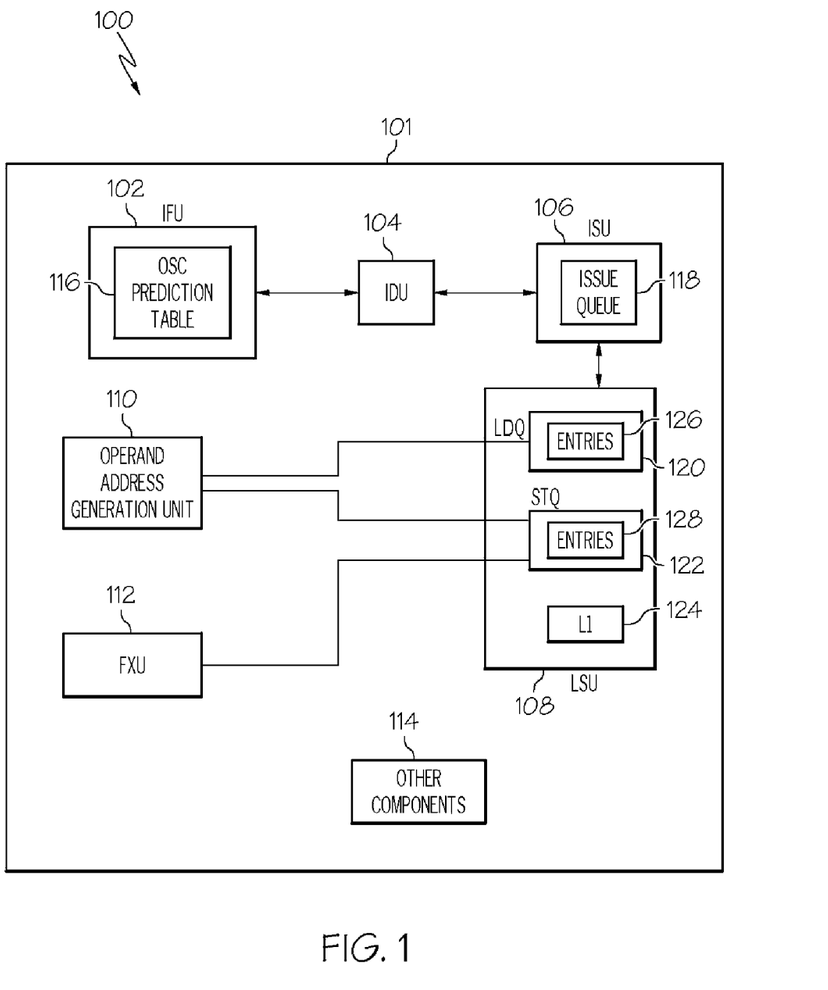
FIG. 1 illustrates one example of an operating environment according to one embodiment of the present invention.

FIG. 1 is a block diagram illustrating one example of an operating environment 100 applicable to one or more processes instructions and data in accordance with one or more embodiments of the present invention. The processor 101 comprises a single integrated circuit processor such as a superscalar processor, which, includes various execution units, registers, buffers, memories, and other functional units that are all formed by integrated circuitry. The processor 101, in one embodiment, is capable of issuing and executing instructions out-of-order.

The processor 101, in one embodiment, comprises an instruction fetch unit (IFU) 102, an instruction decode unit (IDU) 104, an instruction issue unit (ISU) 106, a load/store unit (LSU) 108, an operand address generation unit 110, a fixed point unit 112 (or any other execution unit(s)), and other components 114 such as various other execution units, registers, buffers, memories, and other functional units. The IFU 102, in one embodiment, comprises an operand-store-compare (OSC) prediction table 116. The OSC prediction table 116 is discussed in greater detail below.

The issue unit 106, in this embodiment, comprises an issue queue 118. The LSU 106, in this embodiment, comprises a load queue (LDQ) 120, a store queue (STQ) 122, and an L1 cache 124. The LDQ 120 and the STQ 122 each comprise entries 126, 128, respectively, that track additional information associated with outstanding load and store instructions. It should be noted that various embodiments of the present invention are not limited to the configuration of the processor 101 as shown in FIG. 1. The embodiments of the present invention are applicable to a variety of architectures which can vary from the example shown in FIG. 1.

In general, the IFU 102 fetches instruction codes stored in an I-cache, which can be part of the L1 cache 124. These fetched instruction codes are decoded by the IDU 104 into instruction processing data. Once decoded, the instructions are dispatched and temporarily placed in an appropriate issue queue 118. The instructions are held in the issue queue 118 until all their required operands are available. From the issue queue(s) 118, instructions can be issued opportunistically to the execution units, e.g., LSU 108, FXU 112, etc., of the processor 100 for execution. In other words, the instructions can be issued out-of-order. The instructions, however, are maintained in the issue queue(s) 118 until execution of the instructions is complete, and the result data, if any, are written back, in case any of the instructions needs to be reissued.

During execution within one of the execution units 108, 112 an instruction receives operands, if any, from one or more architected and/or rename registers within a register file coupled to the execution unit. After an execution unit finishes execution of an instruction, the execution unit writes the result to the designated destination as specified by the instruction and removes the instruction from the issue queue and the completion of instructions can then be scheduled in program order. The operand address generation unit 110 generates operand address information for load and store instructions and writes these addresses into the respective LDQ 120 and the STQ 122. The FXU 112 writes data values in the STQ 122.

The LSU 108, as discussed above, receives load and store instructions from the ISU 106, and executes the load and store instructions. In general, each load instruction includes address information specifying an address of needed data. In one embodiment, the LSU 108 supports out of order executions of load and store instructions, thereby achieving a high level of performance. In one embodiment, the LSU 108 is pipelined. That is, the LSU 108 executes load and store instructions via a set of ordered pipeline stages performed in sequence.

OSC Hazard Management

As discussed above, three types of hazards (store-hit-load, non-forwardable load-hit store, and persistent non-forwardable load-hit store) can occur in a processor that executes load and store instructions out-of-order. Therefore, in addition to the general processing mechanisms discussed above with respect to FIG. 1, one or more of the following embodiments can also be implemented within the processor 100 to predict and avoid these OSC hazards.

In general, every Load is allocated an entry in the LDQ 120, which saves the address of each load after it executed until completion. Every Store is allocated an entry in the STQ 122, which similarly saves the store address, from execution of the store address computation until the store completes and has written its data to the L1 cache 124. However, based on the type of hazard detected, an LDQ entry and an STQ entry can also comprise additional information to predict and avoid OSC hazards.

For example, in one embodiment, the LSU 108 executes a load instruction and compares this load to a corresponding entry in the STQ 122. The load instruction determines that store-data-forwarding cannot be performed. For example, the load is executing prior to the store data being written to the STQ (nf-LHS) or store-data-forwarding is not allowed even when the data is available (persistent nf-LHS). The load instruction then sets an OSC hazard bit such as an "e-flag" (e.g., an execution flag) in the STQ entry it compared against if the load instruction detected an nf-LHS hazard. Alternatively, the load instruction sets an OSC hazard bit such as a "w-flag" (e.g., a write flag) in the STQ entry it compared against if the load instruction detected a persistent nf-LHS hazard. The load instruction also sets the same OSC hazard bit such as the e-flag or the w-flag in its own entry in the LDQ 120.

When an executed store instruction detects an SHL hazard and performs an SHL flush against an LDQ entry, the store instruction sets an OSC hazard bit such as the "e-flag" in its own STQ entry, and also sets an OSC hazard bit such as the "e-flag" in the (oldest) LDQ entry the instructions compares against. It should be noted that this LDQ entry is invalidated due to the resulting flush, but the "e-flag" is retained in the LDQ 120. When the processor pipeline starts refetching and re-executing the flushed instructions, the same load is allocated the same LDQ entry, which now has the "e-flag" set from before the flush.

Figure 2:
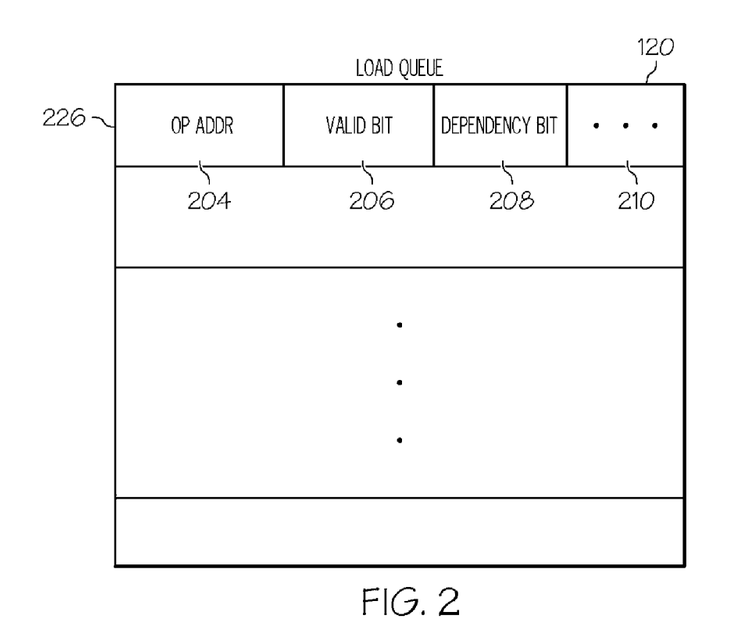
FIG. 2 shows one example of a load queue entry according to one embodiment of the present invention.
Figure 3:
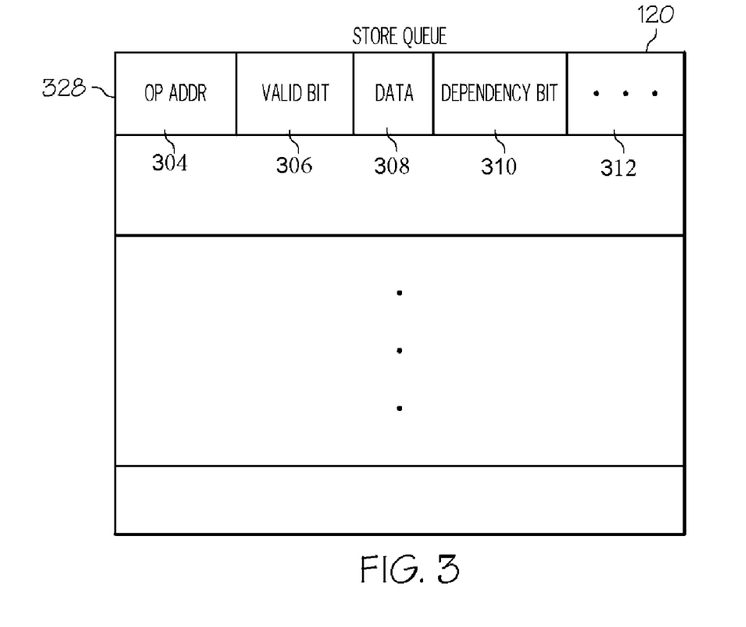
FIG. 3 shows one example of a store queue entry according to one embodiment of the present invention.

FIGS. 2-3 show one example of an LDQ 226 and STQ 328 entry, respectively, according to one embodiment of the present invention. As can be seen in FIG. 2, in addition to general information such as operand address information 204, valid bit information 206, and other general information 210, an entry 226 in the LDQ queue 120 also comprises one or more OSC hazard bits 208. As discussed above, this OSC hazard indicating bit 208 can be an e-flag or a w-flag depending on whether the load instruction encountered an nf-LHS hazard or a persistent nf-LHS hazard. This OSC hazard bit 208 can also be set by a store instruction, as discussed above. It should be noted that other types of flags, etc., can also be used to designate that the load instruction encountered an nf-LHS hazard or a persistent nf-LHS hazard.

As can be seen in FIG. 3, in addition to general information such as operand address information 304, valid bit information 306, data value information 308, and other general information 312, an entry 328 in the STQ queue 120 also comprises one or more OSC hazard bits 310. As discussed above, this OSC hazard bit 310 can be an e-flag or a w-flag depending on whether a load instruction encountered an nf-LHS hazard or a persistent nf-LHS hazard. Also, this OSC hazard bit 310 can be an e-flag if the store instruction encountered an SHL hazard, as discussed above.

It should be noted that other types of flags, etc., can also be used to designate that the load instruction encountered an nf-LHS hazard or a persistent nf-LHS hazard and/or that a store instruction encountered an SHL hazard. Also, an OSC hazard indicating bit 208, 310 in one of the queues 120, 122 will match at least one OSC hazard indicating bit 208, 310 in the other queue 120, 122 since the load or store instruction sets the same bit in an entry of the other queue as it sets in an entry of its own queue. Also, a discussion on how the OSC hazard bit information 208, 310 is used to predict and avoid OSC hazards is given below.

Once the load instruction completes, the load instruction determines if it has OSC hazard bit information, such as an e-flag or a w-flag, in the LDQ 120. If so, the load instruction indicates this to the IFU 102. The IFU 102, in one embodiment, then generates an entry in an OSC prediction table 116 for this particular load instruction. The OSC prediction table will create an entry based on the instruction address of the Load and remember the one or more flags for this Load. For example, an entry in OSC prediction table indicates whether a Load is associated with an e-flag and/or a w-flag, where the Load can have both flags if the Load compares against multiple store queues.

When a store instruction has completed and is written back to the L1 cache 124, the store instruction determines if it has OSC hazard bit information, such as an e-flag or a w-flag, in the STQ 122. If so, the store instruction indicates this to the IFU 102. The IFU 102 then generates an entry in an OSC prediction table 116, for this particular store instruction comprising the instruction address of the store instruction and the one or more flags under the instruction address of the Store. Also, when the store instruction is written back to the L1 cache 124, the STQ 122 informs the ISU 106 of the STQ-entry-number (stag) of that given store instruction within the STQ 122.

Figure 4:
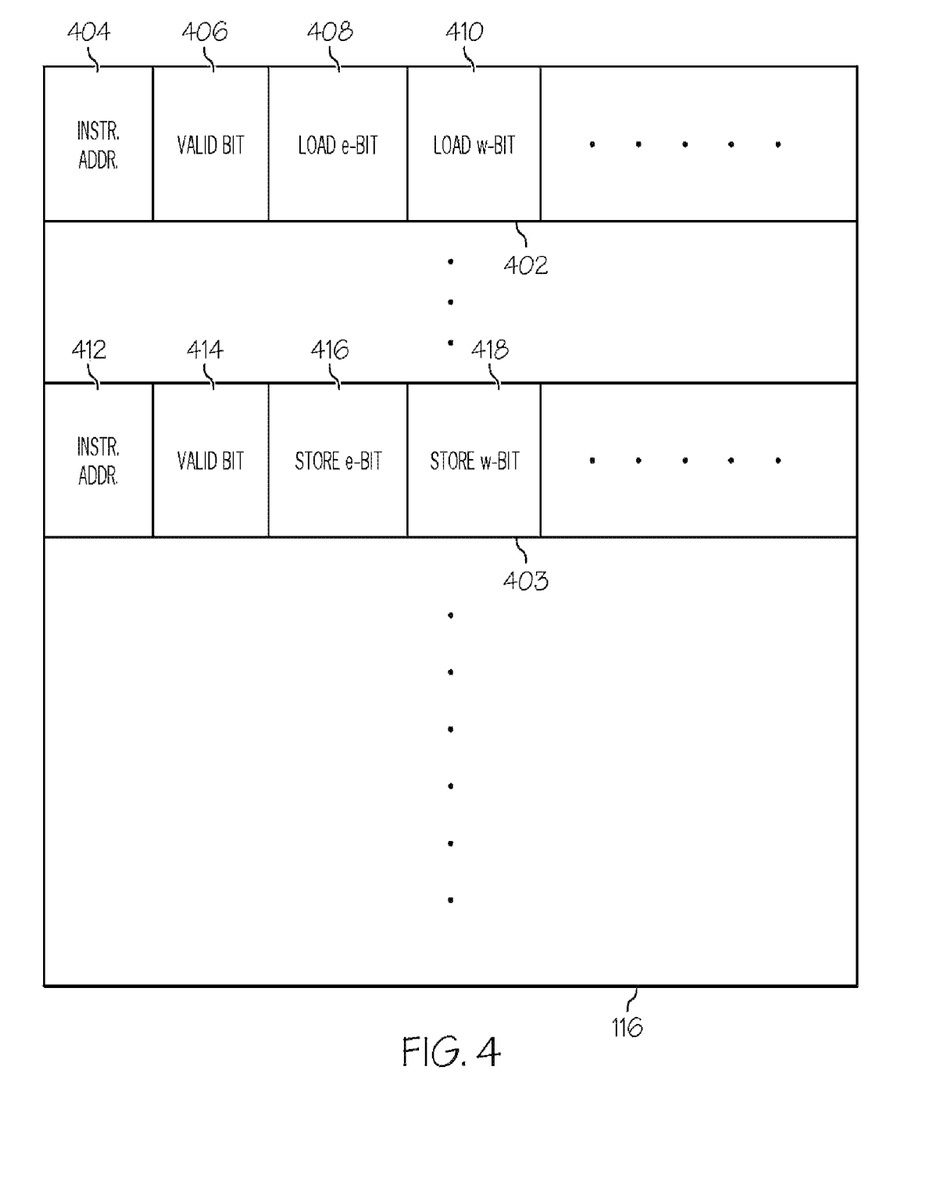
FIG. 4 shows one example of an operand store compare hazard prediction table entry according to one embodiment of the present invention.

FIG. 4 shows one example of a Load instruction entry and a Store instruction entry within the OSC prediction table 116. In particular, FIG. 4 shows that the Load instruction entry 402 comprises the instruction address 404 of the instruction, an entry valid bit 406, and one or more hazard indicating bits such as a load "e" bit 408 and a load "w" bit 410. The Store instruction entry 403 comprises the instruction address 412 of the instruction, an entry valid bit 414, and one or more hazard indicating bits such as a store "e" bit 416 and a store "w" bit 418. The OSC hazard indicating bits 408, 410, 416, 418 are set based on the information obtained from the load instructions and the STQ 122, as discussed above. Each Load and Store entry within the OSC prediction table 116 are created independent of each other. In other words, a Load entry in the OSC prediction table 116 does not reference and is not referenced by a Store entry in the OSC prediction table 116 or any other table for that matter, and vice versa.

For example, a load instruction that has set an "e" dependency bit in its LDQ entry and an "e" bit in an STQ entry of a corresponding store instruction notifies the IFU 102 of this, which then creates an entry 402, 403 for each of the load and store instructions in the prediction table 116, as shown in FIG. 4. In this example, the load "e" bit 408 is set in the Load instruction entry 402 and the store "e" bit 416 is set in the Store instruction entry 403. It should also be noted that various techniques can be used to generate the prediction table based on instruction addresses. For example, techniques directed to overflows (least-recently-used techniques), read/write conflicts (queuing), and similar techniques for prediction tables can be used.

Once the prediction table 116 has been populated, each time an instruction is fetched by the IFU 102 and sent into the pipeline for decoding by the IDU 104, the IFU 102, in parallel, queries the OSC prediction table 116 and sends this information to the IDU 104. This query is used by the IDU 104 to determine whether the given fetched instruction is recognized as a load and/or store comprising an "e" or "w" bit. For example, the IFU 102 uses the instruction address of an instruction to query the prediction table 116 to identify an entry with the corresponding instruction address. The information obtained from the OSC prediction table 116 is passed from the IDU 104 to the ISU 106.

The ISU 106 uses this dependency information to perform the following. If the instruction comprises a store-e-bit the ISU 106 remembers the instruction as a store-e-bit instruction. If the instruction has a store-w-bit, the ISU 106 remembers the STQ entry number ("stag") that is allocated for the instruction. The ISU 106, in one embodiment, remembers the youngest such stag, referred to as the w-stag. If the instruction has a load-e-bit, the ISU 106 marks this instruction as being dependent on any prior instruction that—was marked with a store-e-bit. This dependency is very similar to the dependency that is created between the writer and the reader of a given General Purpose Register. The ISU 106 ensures that the load instruction does not execute before the store instruction has successfully executed, and has written the store address and data into its STQ entry. By delaying the load until that point, the ISU 106 guarantees that the Load can obtain store-forwarded data from the STQ entry, and thus, an SHL hazard or an nf-LHS hazard is prevented.

If the instruction has a load-w-bit, the Load is marked such that the ISU 106 does not allow the load to execute until the stag of the last store-w-bit Store before the Load (i.e. the w-stag) has written back to the L1 cache 124 (as discussed above, the STQ 122 informs the ISU 106 when the writeback occurs). By delaying the load until after the store has written back to the L1 cache 124, persistent nf-LHS hazards are prevented. Effectively the above process performed by the ISU 106 makes all e-bit-Loads dependent on all prior e-bit-Store's execution, and all w-bit-Loads dependent on all prior w-bit-Store's write back.

It should be noted that sometimes the store instruction that last set the w-stag in the ISU 106 gets flushed, e.g., due to a branch wrong. However, the w-stag can still be tracked. For example, in one embodiment, the youngest non-flushed w-bit store is designated as the saved youngest w-bit store. This option may require significant tracking expense. In another embodiment, the youngest non-flushed stag becomes the saved youngest w-bit store. This store may not have actually been marked as a w-bit store. This option does not require much tracking expense, but treats a store as a w-store even though that store may not have had a w-bit prediction. This leads to a slight performance degradation. In yet another embodiment, the saved youngest w-bit store is invalidated. W-bit loads dispatched while the saved youngest w-bit store is still in an invalid state will not mark a stag dependency.

With respect to instructions that are both loads and stores, steps are taken to ensure that these instructions do not mark a w-bit dependency on themselves. This is particularly a problem if the instruction is made of multiple parts. Preventing this dependency can be accomplished, in one embodiment, by ensuring that w-bit marked store-parts always follow the w-bit marked load-parts, or by ensuring that the saved youngest w-bit store is not updated until all of the parts of an instruction have dispatched. Generally, marking e-bit dependencies within an instruction consisting of multiple parts is safe because the parts will simply be issued in-order with respect to each other. However, it is possible to use similar methods to prevent this dependency, if desired.

In a one embodiment, a vector of e-bit marked stores is maintained (other register dependency-like tracking mechanisms are possible, 1 bit per issue queue entry, and e-bit marked loads are made dependent on all older valid issue queue entries for which the corresponding bit in the vector is set. Bits in the vector are written when an instruction is dispatched into them, and are put in the set state if the instruction is an e-bit store or in the unset state otherwise.

Alternatively, Loads and Stores can be tracked in groups of e and w bits (e.g. there could be 5 e-bits e1 . . . e5, and only e1-stores and e1-loads are paired, and e2-stores and e2-loads are paired, and so on). At hazard time, a random e-bit (e.g. e2) can be selected to set in the LDQ and STQ. This design can be extended to the method discussed above where certain instructions are both loads and stores (e.g. the CS instruction in System z), by treating the two aspects separately, but enforcing the dependencies both as a Store and a Load.

As can be seen, the above embodiments of the present invention are advantageous in that a prediction table is created that predicts which Loads and Stores have dependencies, and the type of these dependencies (such as e-bit or w-bit dependencies). Then after instruction decoding, e-bit Loads are made dependent on all prior e-bit Stores, and are treated by the instruction issue logic as if there was a regular register dependency. This effectively delays execution of the e-bit Load instruction until after all e-bit Stores have executed their address calculation, and written their data into the STQ. This in effect removes SHL and nf-LHS hazards. For w-bit dependencies, the Load is made dependent on the L1 cache writeback of the last store that was predicted as w-bit Store. This effectively prevents persistent nf-LHS hazards. Each Load entry and each Store entry are independent of each other within the OSC prediction table. In other words, a Load instruction entry does not reference a Store instruction entry and vice versa. This allows dependencies to be created between multiple store instructions and multiple loads.

Moreover, according to one embodiment, if a Load has both an e-bit and a w-bit set, the Load is delayed until after all e-bit Stores and after all w-bit Stores indicated in the OSC prediction table. That is, the Load is delayed until after all e-bit Stores have executed their address calculation, and written their data into the STQ, and the Load is also made dependent on the L1 cache writeback of the last w-bit Store.

Also, according to one example, if a Load has an e-bit set in the OSC table and a Store has both an e-bit and a w-bit set in the OSC table, the Load is delayed until after the Store with the e-bit set, has executed its address calculation, and written its data into the STQ (e.g., the data is forwarded). If a Load has a w-bit set and a Store has both an e-bit and a w-bit set in the OSC table, the Load is delayed until after the Store with the w-bit set, has executed the L1 cache writeback. Lastly, if a Load has both the e-bit set and the w-bit set, and a Store has both the e-bit set and the w-bit set, the w-bit prevails. The Load with the w-bit set is delayed until after the execution of the Store with the w-bit set, which corresponds to the longest delay (dependent on the L1 cache writeback) of the Store with the w-bit set.

According to one embodiment, one or more Loads and one or more Stores can be included in one complex instruction. Various examples of this type of complex instruction may be found in the following publication entitled "z/Architecture Principles of Operation", SA22-7832-07, Eighth Edition, published February 2009, by International Business Machines, which is hereby incorporated by reference in its entirety. That is, one instruction can be considered a Load and a Store. The same instruction can create one or more Load entries and one or more Store entries in the OSC table. These Loads and Stores can be tracked according to their respective e-bits and w-bits in the OSC table.

Operational Flow Diagram

Figure 5:
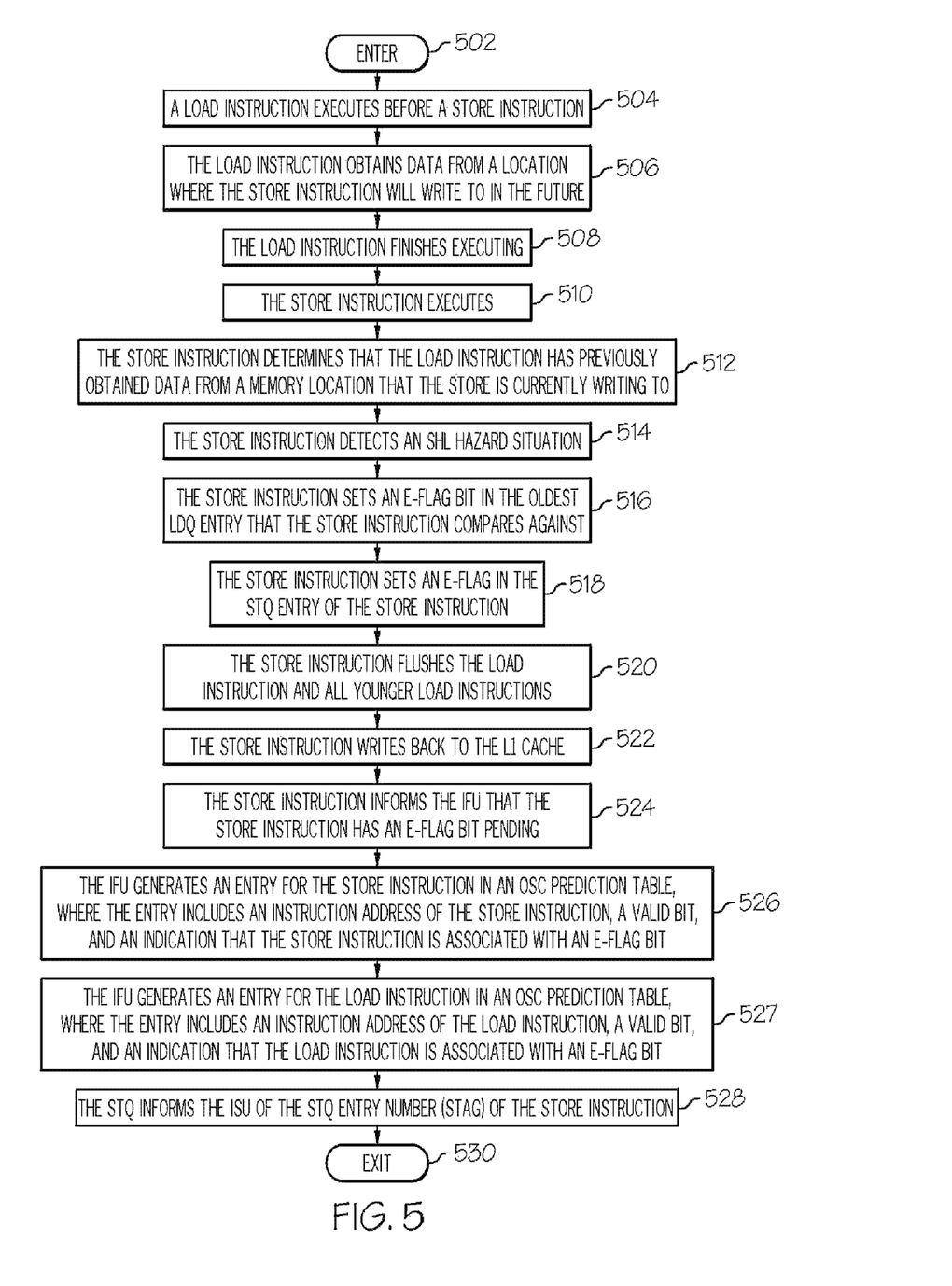
FIGS. 5-7 are operational flow diagrams illustrating various examples of creating an entry in an operand store compare hazard prediction table according to various embodiments of the present invention.

FIG. 5 is an operational flow diagram illustrating one example of generating an entry in an OSC prediction table 116 for predicting and preventing OSC hazards. The operational flow diagram of FIG. 5 begins at step 502 and flows directly into step 504. A load instruction, at step 504, begins executing prior to an associated store instruction. The load instruction, at step 506, obtains data from a memory location where the store instruction will write to in the future. The load instruction, at step 508, finishes executing. The store instruction, at step 510, begins to execute. The store instruction, at step 512, determines that the load instruction has previously obtained data from a memory location that the store instruction is currently writing to.

The store instruction, at step 514, determines that an SHL hazard has been encountered. The store instruction, at step 516, then sets a flag bit such as an e-flag bit to indicate this instruction is a candidate for an OSC hazard situation. This e-flag bit is set in the oldest LDQ entry that store instruction compares against. The store instruction, at step 518, sets an e-flag bit in the STQ entry associated with the store instruction in the STQ 122. The store instruction, at step 520, then flushes the load instruction and all younger load instructions from the pipeline.

The store instruction, at step 522, writes back to the L1 cache 124. The store instruction, at step 524, informs the IFU 102 that the store instruction has an e-flag (or w-flag as set by a load instruction) bit pending. The IFU 102, at step 526, generates an entry for the store instruction in the OSC prediction table 116. This entry includes an instruction address of the store instruction, a valid bit, and an indication that the store instruction is associated with an e-flag. For example, a bit or flag can be set in the entry indicating that the instruction is associated with a store-e-bit. The IFU 102, at step 527, also generates an entry for the load instruction in the OSC prediction table 116. For example, after the load is flushed from the SHL at step 520 the pipeline re-executes the load, which uses the same LDQ entry as before. After the load completes the load writes its flag (e.g., e-bit) into the IFU prediction table 116. This entry includes an instruction address of the load instruction, a valid bit, and an indication that the load instruction is associated with an e-flag. The store and load entries are independent of each other and do not reference each other in anyway. The STQ 122, at step 528, informs the ISU 106 of the STQ entry number (stag) of the store instruction that has written back to the L1 cache 124. The control flow then exits at step 530.

Figure 6:
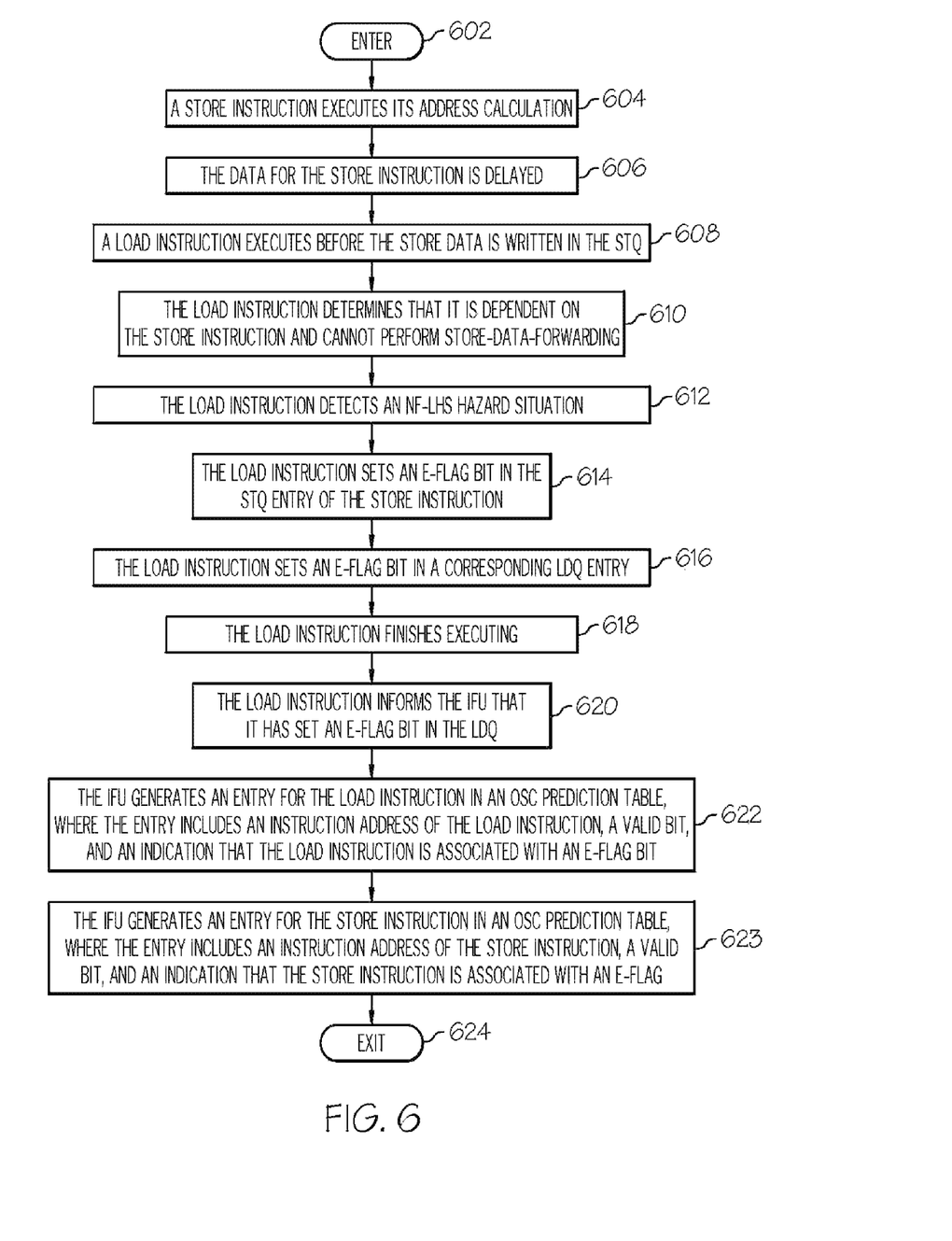

FIG. 6 is an operational flow diagram illustrating another example of generating an entry in an OSC prediction table 116 for predicting and preventing OSC hazards. The operational flow diagram of FIG. 6 begins at step 602 and flows directly into step 604. A store instruction, at step 604, executes its address calculation. The data for the store instruction, at step 606, is delayed. The load instruction, at step 608, executes before the store data is written into the STQ 122. The load instruction, at step 610, determines that it is dependent on the store instruction and cannot perform store-data-forwarding.

The load instruction, at step 612, determines that an nf-LHS situation has been encountered. The load instruction, at step 614, sets an e-flag bit in the STQ entry of the store instruction. The load instruction, at step 616, sets an e-flag bit in a corresponding LDQ entry. The load instruction, at step 618, finishes executing. The load instruction, at step 620, sends information to the IFU 102 that it has set an e-flag bit in the LDQ 120. The IFU, at step 622, generates an entry for the load instruction in an OSC prediction table 116. This entry includes an instruction address of the load instruction, a valid bit, and an indication that the load instruction is associated with an e-flag bit. For example, a bit or flag can be set in the entry indicating that the instruction is associated with a load-e-bit. The IFU 102, at step 623, also generates an entry for the store instruction in the OSC prediction table 116. For example, when the store instruction writes back into the L1-cache 206 (which can happen before or after step 620) the flag (e-bit) in the STQ is communicated to the IFU 102 and an entry for the store is created in the table 116. This entry includes an instruction address of the store instruction, a valid bit, and an indication that the store instruction is associated with an e-flag bit. The load and store entries are independent of each other and do not reference each other in anyway. The control flow then exits at step 624.

Figure 7:
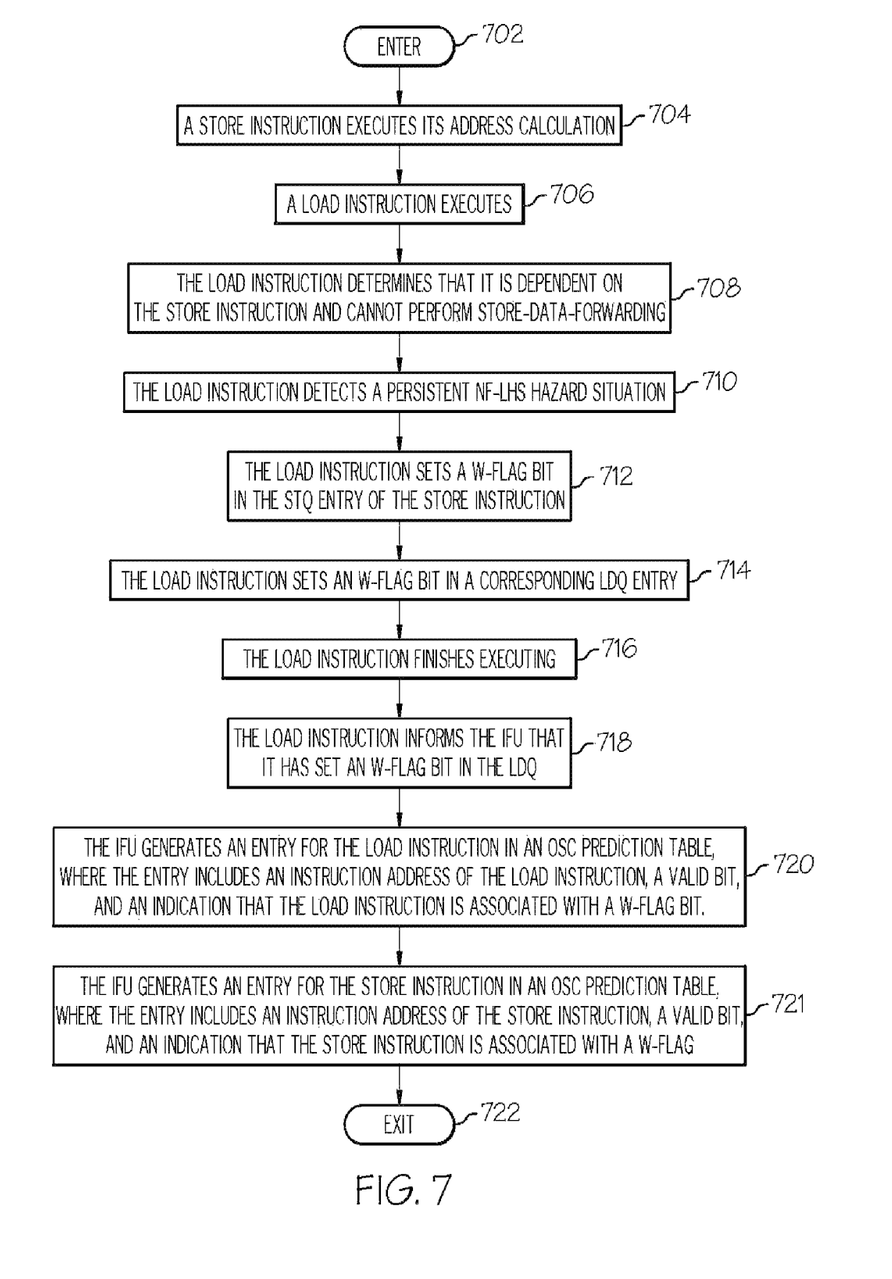

FIG. 7 is an operational flow diagram illustrating yet another example of generating an entry in an OSC prediction table 116 for predicting and preventing OSC hazards. The operational flow diagram of FIG. 7 begins at step 702 and flows directly into step 704. A store instruction, at step 704, executes its address calculation. A load instruction, at step 706, begins its execution. The load instruction, at step 708, determines that it is dependent on the store instruction and cannot perform store-data-forwarding.

The load instruction, at step 710, determines that a persistent nf-LHS situation has been encountered. The load instruction, at step 712, sets a w-flag bit in the STQ entry of the store instruction. The load instruction, at step 714, sets a w-flag bit in a corresponding LDQ entry. The load instruction, at step 716, finishes executing. The load instruction, at step 718, informs the IFU 102 that it has set a w-flag bit in the LDQ 120. The IFU, at step 720, generates an entry for the load instruction in an OSC prediction table 116. This entry includes an instruction address of the load instruction, a valid bit, and an indication that the load instruction is associated with a w-flag bit. For example, a bit or flag can be set in the entry indicating that the instruction is associated with a load-w-bit. The IFU, at step 721, generates an entry for the store instruction in an OSC prediction table 116. For example, when the store instruction writes back into the L1-cache 206 (which can happen before or after step 718) the flag (e-bit) in the STQ is communicated to the IFU 102 and an entry for the store is created in the table 116. This entry includes an instruction address of the store instruction, a valid bit, and an indication that the store instruction is associated with a w-flag bit. The load and store entries are independent of each other and do not reference each other in anyway. The control flow then exits at step 722.

Figure 8:
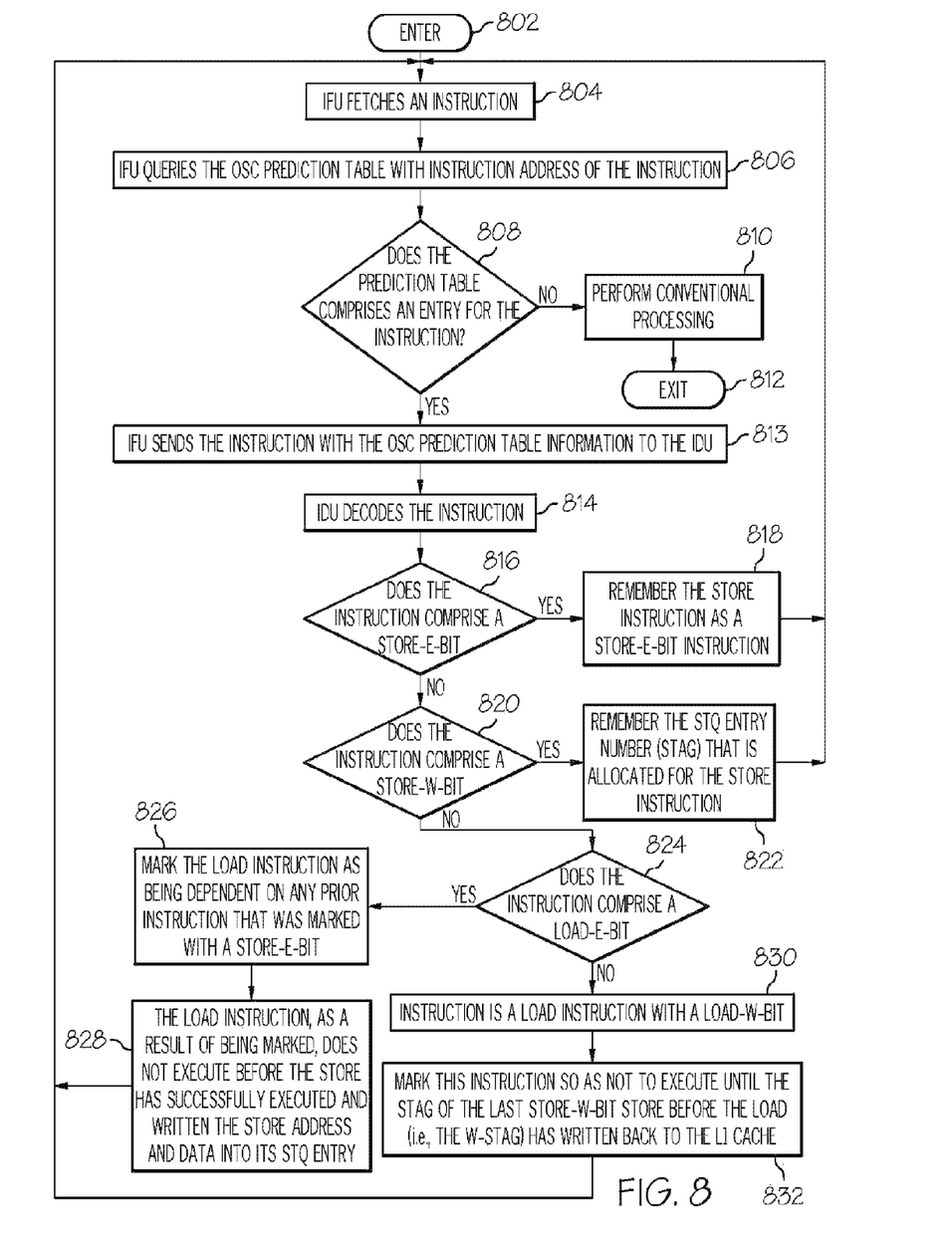
FIG. 8 is an operational flow diagram illustrating one example of predicting and preventing operand store compare hazards according to various embodiments of the present invention.

FIG. 8 is an operational flow diagram illustrating one example of predicting and preventing OSC hazards. The operational flow diagram of FIG. 8 begins at step 802 and flows directly into step 804. The IFU 102, at step 804, fetches an instruction. The IFU 102, at step 806, in parallel, queries the OSC prediction table 116 with the instruction address of the instruction. The IFU 102, at step 808, determines if the instruction comprises an entry in the prediction table 116. If the result of this determination is negative, conventional processing, at step 810, is performed. The control flow then exits at step 812. If the result of the determination is positive, the IFU 102, at step 813, sends the instruction and the OSC hazard information associated with the instruction obtained from the OSC prediction table 116 to the IDU 104. The IDU 104, at step 814, decodes the instruction.

If the result of the determination at step 808 is positive, the IDU 104, at step 816, determines if the instruction comprises a store-e-bit (e.g., the instruction is a store with an e-flag bit). If the result of this determination is positive, the ISU 106, at step 818, remembers the store instruction as a store-e-bit. If this instruction only comprises a single bit then the control flow then returns to step 804. However, if the instruction comprises multiple bits because it performs both one or more loads and one or more stores, the IDU performs steps 826 and 828 if the other bit is a load "e" bit or performs step 832 if the other bit is a load "w" bit.

If the result of the determination at step 816 is negative, the IDU 104, at step 820, determines if the instruction comprises a store-w-bit (e.g., the instruction is a store with a w-flag bit). If the result of this determination is positive, the ISU 106, at step 822, remembers the STQ entry number (stag) that is allocated to the store instruction. The control flow then returns to step 804.

If the result of the determination at step 820 is negative, the IDU 104, at step 824, determines if the instruction comprises a load-e-bit (e.g., the instruction is a load with an e-flag bit). If the result of this determination is positive, the ISU 106, at step 826, marks the load instruction as being dependent on any prior instruction that was marked with a store-e-bit. The load instruction, as a result of being marked, at step 828, is prevented from executing before the Store has successfully executed and written the store address and data into its STQ entry. The control flow then returns to step 804.

If the result of the determination at step 824 is negative, the instruction, at step 830, is determined to be a load with a w-flag bit. The ISU 106, at step 832, marks this instruction so as not to execute until the stag of the last store-w-bit Store before the Load (i.e., the w-stag) has written back to the L1 cache. The control flow then returns to step 804.

Information Processing System

Figure 9:
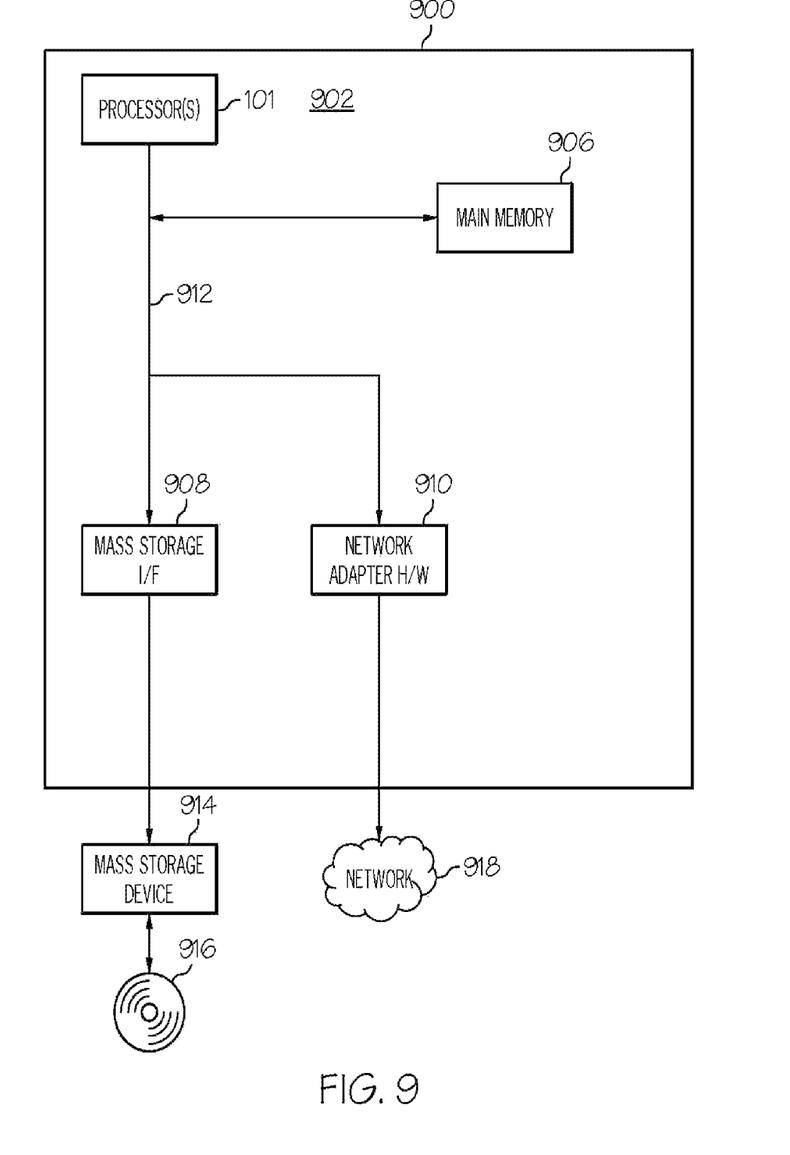
FIG. 9 is a block diagram illustrating one example of an information processing system according to one embodiment of the present invention.

FIG. 9 is a block diagram illustrating detailed view an information processing system 900 according to one embodiment of the present invention. The information processing system 900 is based upon a suitably configured processing system adapted to implement one or more embodiments of the present invention. Any suitably configured processing system is similarly able to be used as the information processing system 900 by embodiments of the present invention.

The information processing system 900 includes a computer 902. The computer 902 has a processor(s) 101 such as the processor of FIG. 1. The processor 101 comprises the IFU 102 including the OSC prediction table 116; the IDU 104; the ISU 106 comprising the issue queue 118; the LSU 108 comprising the LDQ 120, the STQ 122, and the L1 cache 124; the operand address generating unit 110, the FXU 112, and various other components 114, as shown in FIG. 1.

The processor 101 is connected to a main memory 906, mass storage interface 908, and network adapter hardware 910. A system bus 912 interconnects these system components. The mass storage interface 908 is used to connect mass storage devices, such as data storage device 914, to the information processing system 900. One specific type of data storage device is an optical drive such as a CD/DVD drive, which may be used to store data to and read data from a computer readable medium or storage product such as (but not limited to) a CD/DVD 916. Another type of data storage device is a data storage device configured to support, for example, file system operations.

In one embodiment, the information processing system 600 utilizes conventional virtual addressing mechanisms to allow programs to behave as if they have access to a large, single storage entity, referred to herein as a computer system memory, instead of access to multiple, smaller storage entities such as the main memory 906 and data storage device 916. Note that the term "computer system memory" is used herein to generically refer to the entire virtual memory of the information processing system 900.

Although only one processor 101 is illustrated for computer 902, computer systems with multiple processors can be used equally effectively. Various embodiments of the present invention further incorporate interfaces that each includes separate, fully programmed microprocessors that are used to off-load processing from the processor 101. An operating system (not shown) included in the main memory is a suitable multitasking operating system such as, and not for limitation, the GNU/Linux, AIX, Solaris, and HP-UX. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 900. The network adapter hardware 910 is used to provide an interface to one or more networks 918. Various embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD or DVD, e.g. CD 916, CD ROM, or other form of recordable media, or via any type of electronic transmission mechanism.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a program product via CD or DVD, e.g. CD 916, CD ROM, or other form of recordable media, or via any type of electronic transmission mechanism.

What is claimed is:

1. An information processing system capable of managing execution order of computer instructions in program order execution or in out-of-order execution in a computer system, a first instruction comprising a store instruction and a second instruction comprising a load instruction, the information processing system comprising:
   a memory; and
   a processor communicatively coupled to the memory, wherein the processor is configured to perform a method comprising:
      storing an instruction address of the first instruction in a first entry in a prediction table, each entry of the prediction table comprising no more than one instruction address;
      storing an instruction address of the second instruction in a second entry, different from the first entry, in the prediction table;
      storing a first flag in the first entry, associated with the first instruction, indicating a type of data dependency relationship between the first instruction and the second instruction with the first instruction in a sequence of instructions being in program order prior to the second instruction, and wherein the first flag stored in the first entry does not reference any other entry in the prediction table;
      storing a second flag in the second entry, associated with the second instruction, indicating the type of data dependency relationship between the first instruction and the second instruction, and wherein the second flag stored in the second entry does not reference any other entry in the prediction table; and
      predicting the execution order of the second instruction relative to the first instruction based at least on the type of data dependency relationship indicated by the first flag and second flag that are stored in the first entry and the second entry, respectively, in the prediction table.

2. The system of claim 1, wherein responsive to predicting that the first instruction and second instruction are to be executed in program order, causing the second instruction to be executed after execution of the first instruction.

3. The system of claim 1, wherein responsive to predicting that the first instruction and second instruction are not required to be executed in program order, permitting out-of-order execution of the second instruction relative to the execution of the first instruction.

4. The system of claim 1, wherein the first instruction and the second instruction are included in one complex instruction.

5. The system of claim 1, wherein the method further comprising:
   determining that the execution of the load instruction of the second instruction is data dependent on the execution of the store instruction of the first instruction in a sequence of instructions for execution by the computer system, with the store instruction in the sequence of instructions being in program order prior to the load instruction;
   determining a type of data dependency relationship between the store instruction and the load instruction;
   storing an instruction address of the store instruction of the first instruction in a first entry in the prediction table, each entry of the prediction table comprising no more than one instruction address;
   storing an instruction address of the load instruction of the second instruction in a second entry in the prediction table;
   storing in the prediction table a first flag in the first entry, associated with the instruction address of the store instruction of the first instruction, indicating the type of data dependency relationship between the store instruction and the load instruction, and wherein the first flag stored in the first entry for the store instruction of the first instruction does not reference any other entry in the prediction table;
   storing in the prediction table a second flag in the second entry, associated with the instruction address of the load instruction of the second instruction, indicating the type of data dependency relationship between the store instruction and the load instruction, and wherein the second flag stored in the second entry for the load instruction of the second instruction does not reference any other entry in the prediction table;
   predicting the execution order of the load instruction relative to the store instruction based at least on the type of data dependency relationship indicated by the first flag and second flag that are stored in the first entry and the second entry, respectively, in the prediction table; and
   responsive to predicting that the store instruction and load instruction are to be executed in program order, causing the load instruction to be executed after execution of the store instruction.

6. The system of claim 1, wherein the method further comprising:
   determining that the execution of the load instruction of the second instruction is data dependent on the execution of the store instruction of the first instruction in a sequence of instructions for execution by the computer system, with the store instruction in the sequence of instructions being in program order prior to the load instruction;
   determining a type of data dependency relationship between the store instruction and the load instruction;
   storing an instruction address of the store instruction of the first instruction in a first entry in the prediction table, each entry of the prediction table comprising no more than one instruction address;
   storing an instruction address of the load instruction of the second instruction in a second entry in the prediction table;
   storing in the prediction table a first flag in the first entry, associated with the instruction address of the store instruction of the first instruction, indicating the type of data dependency relationship between the store instruction and the load instruction, and wherein the first flag stored in the first entry for the store instruction of the first instruction does not reference any other entry in the prediction table;

storing in the prediction table a second flag in the second entry, associated with the instruction address of the load instruction of the second instruction, indicating the type of data dependency relationship between the store instruction and the load instruction, and wherein the second flag stored in the second entry for the load instruction of the second instruction does not reference any other entry in the prediction table;

predicting the execution order of the load instruction relative to the store instruction based at least on the type of data dependency relationship indicated by the first flag and second flag that are stored in the first entry and the second entry, respectively, in the prediction table; and responsive to predicting that the store instruction and load instruction are not required to be executed in program order, permitting out-of-order execution of the load instruction relative to the execution of the store instruction.

7. The system of claim 1, wherein the method further comprising:

determining that the execution of the load instruction is data dependent on the execution of each of a plurality of instances of the store instruction in the sequence of instructions for execution by the computer system, with the plurality of instances of the store instruction in the sequence of instructions being in program order prior to the load instruction;

determining a type of data dependency relationship between each of the plurality of instances of the store instruction and the load instruction;

storing in a plurality of entries of the prediction table a respective plurality of instruction addresses of the plurality of instances of the store instruction in the sequence of instructions for execution by the computer system, each entry of the prediction table comprising no more than one instruction address;

storing in the prediction table a plurality of flags in the respective plurality of entries of the prediction table, respectively associated with the plurality of instruction addresses of the plurality of instances of the store instruction, indicating the type of data dependency relationship between each instance of the plurality of instances of the store instruction and the load instruction, and wherein each flag stored in each entry for each of the plurality of instances of the store instruction does not reference any other entry in the prediction table; and responsive to predicting that the plurality of instances of the store instruction and the load instruction are to be executed in program order, causing the load instruction to be executed after execution of all instances of the store instruction having the same flag stored in the prediction table.

8. The system of claim 7, wherein the data dependency relationship indicates that the load instruction is to be delayed at least until after each instance of the plurality of instances of the store instruction stores data to a location in memory.

9. The system of claim 1, wherein the data dependency relationship indicates that the second instruction comprising the load instruction is to be delayed at least until after the first instruction comprising the store instruction stores data to a location in memory.

10. An information processing system capable of managing execution order of computer instructions in program order execution or in out-of-order execution, the information processing system comprising:

a memory; and a processor communicatively coupled to the memory, wherein the processor is configured to perform a method comprising:

creating, based on determining that execution of an instruction has encountered an operand store compare hazard, an entry within an operand store compare hazard prediction table, in which each entry in the table comprises at least an instruction address associated with an instruction, and a plurality of hazard indicating flags associated with the instruction, and wherein each hazard indicating flag can be set to a value to indicate whether a type of operand store compare hazard associated with the instruction has been encountered by the instruction, the entry being created comprising at least an instruction address of the instruction that has been executed, and a plurality of hazard indicating flags in which a first hazard indicating flag is set to a value associated with the instruction that has been executed, wherein the value of the first hazard indicating flag indicates a type of operand store compare hazard that the instruction that has been executed has encountered.

11. The information processing system of claim 10, wherein the executing comprises executing one instruction selected from a load instruction and a store instruction, and wherein the method further comprises:

creating, based on the determining that the operand store compare hazard has been encountered, an entry within the operand store compare hazard prediction table comprising at least an instruction address of the other instruction of the at least one of the load instruction and the store instruction that was not selected, and a plurality of hazard indicating flags in which a second hazard indicating flag is set to a value associated with the other instruction, wherein the first and second hazard indicating flags indicate the same type of operand store compare hazard, and wherein the hazard indicating flag associated with the other instruction is the same value as the value of the first hazard indicating flag associated with the instruction that has been executed, where the second hazard indicating flag associated with the other instruction indicates that the other instruction has encountered the operand store compare hazard.

12. The information processing system of claim 10, wherein the executing comprises executing one instruction selected from a load instruction and a store instruction, and wherein when the instruction that has been executed is a load instruction associated with the entry in the operand store compare hazard prediction table, the load instruction is dependent upon all store instructions each associated with a respective independent entry in the operand store compare hazard prediction table comprising a second hazard indicating flag that indicates the same type of operand store compare hazard as the first hazard indicating flag associated with the load instruction.

13. The information processing system of claim 10, wherein the executing comprises executing one instruction selected from a load instruction and a store instruction, and wherein the method further comprises:
fetching the load instruction;
decoding the load instruction;
querying, in response to the decoding, the operand store compare hazard prediction table with an instruction address of the load instruction;
determining, in response to the querying, that the load address is associated with the entry in the operand store compare hazard prediction table; and
associating the load instruction with a set of store instructions each store instruction in the set being associated with an entry within the operand store compare hazard prediction table comprising a second hazard indicating flag that indicates the same type of operand store compare hazard as the first hazard indicating flag, and wherein the value of the second hazard indicating flag is the same as the value of the first hazard indicating flag associated with the load instruction, wherein the associating makes the load instruction dependent upon the set of store instructions.

14. The information processing system of claim 10, wherein the executing comprises executing one instruction selected from a load instruction and a store instruction, and wherein the executing comprises:
executing the load instruction prior to the store instruction;
executing the store instruction after the load instruction finishes executing,
wherein the load instruction obtains a data set from a memory location where the store instruction performs a subsequent write operation;
determining, by the store instruction, that the load instruction has obtained the data set from the memory location;
determining, by the store instruction in response to the determining that the load instruction has obtained the data set from the memory location, that a store-hit-load hazard has been encountered; and
setting, by the store instruction in response to determining that the store-hit-load hazard has been encountered, a hazard indicating flag in an oldest load queue entry compared against by the store instruction when determining that the load instruction has obtained the data set from the memory location, wherein the hazard indicating flag indicates that the load instruction is associated with the store-hit-load hazard.

15. The information processing system of claim 14, wherein the method further comprises at least one of
informing, by the store instruction, an instruction fetch unit comprising the operand store compare hazard prediction table that the store instruction has set the hazard indicating flag, wherein the instruction fetch unit generates the entry in response to the informing; and
informing, by a store queue in response to the store instruction setting the hazard flag, an instruction issue unit of a store queue entry number within the store queue of the store instruction.

16. A method for managing execution order of load and store operations in a sequence of instructions for execution by a computer system, the method comprising:

executing an instruction, the executed instruction consisting of at least one of a load instruction and a store instruction;
determining, based on the executing, that an operand store compare hazard has been encountered; and
based on the determining, creating an entry within an operand store compare hazard prediction table, the created entry being associated only with the executed instruction and comprising an instruction address of the instruction that has been executed and a hazard indicating flag associated with the instruction that has been executed, the hazard indicating flag indicating a type of operand store compare hazard and set to a value indicating that the instruction that has been executed has encountered the operand store compare hazard.

17. The method of claim 16, wherein the executing comprises executing one instruction selected from the load instruction and the store instruction; further comprising:
creating, based on the determining, an entry within the operand store compare hazard prediction table, the created entry being associated only with the other one instruction of the load instruction and the store instruction that was not selected, and the created entry comprising an instruction address of the other one instruction of the load instruction and the store instruction that was not selected, and a hazard indicating flag associated with the other one instruction, wherein the value of the hazard indicating flag associated with the other one instruction is the same value as the hazard indicating flag associated with the one instruction that has been executed, and wherein the hazard indicating flag associated with the other one instruction indicates that the other one instruction has encountered the operand store compare hazard.

18. The method of claim 17, further comprising:
predicting the execution order of the load instruction relative to the store instruction based at least on the type of data dependency relationship indicated by the hazard indicating flag associated with the one instruction and the hazard indicating flag associated with the other one instruction.

19. The method of claim 16, wherein the executing comprises:
executing the load instruction prior to the store instruction;
executing the store instruction after the load instruction finishes executing,
wherein the load instruction obtains a data set from a memory location where the store instruction performs a subsequent write operation;
determining, by the store instruction, that the load instruction has obtained the data set from the memory location;
determining, by the store instruction in response to the determining, that a store-hit-load hazard has been encountered; and
setting, by the store instruction in response to determining that the store-hit-load hazard has been encountered, a hazard indicating flag in an oldest load queue entry compared against by the store instruction when determining that the load instruction has obtained the data set from the memory location, wherein the hazard indicating flag indicates that the load instruction is associated with the store-hit-load hazard.

20. The method of claim 16, wherein the load instruction and the store instruction are included in one complex instruction.

\* \* \* \* \*